Nov. 16, 1965 KIMISUKE SHIRAE ETAL 3,218,565
AMPLIFIER HAVING AN OUTPUT WHICH IS SUBSTANTIALLY
UNINFLUENCED BY EXTERNAL VARIABLES
Filed Sept. 6, 1961
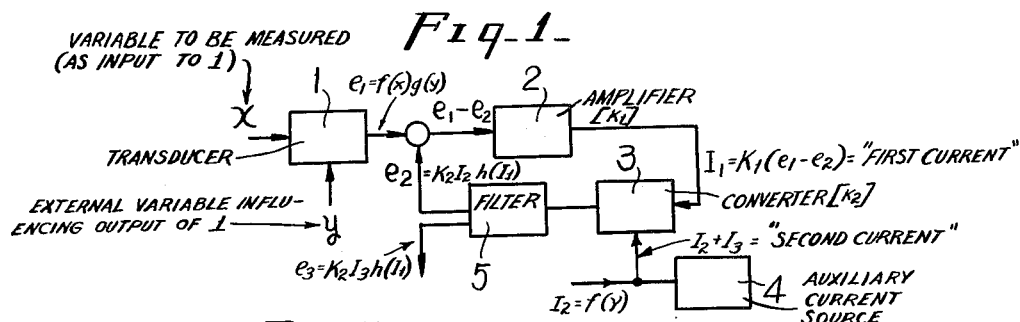
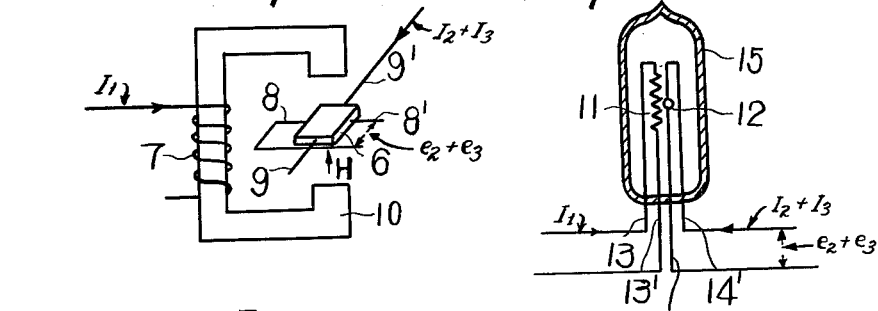
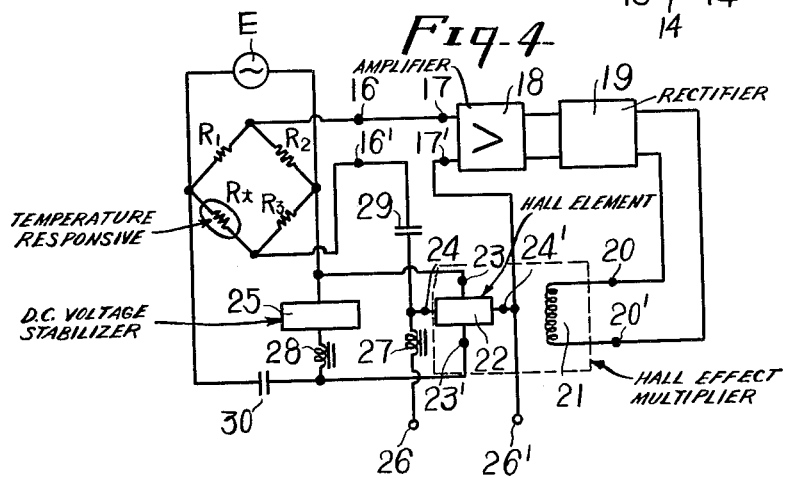
INVENTOR.
KIMISUKE SHIRAE
TAMOTSU KOBAYASHI
BY ISAO ABE
M Glew and Toren
ATTORNEYS United States Patent Office 3,218,565
Patented Nov. 16, 1965

3,218,565
AMPLIFIER HAVING AN OUTPUT WHICH IS SUBSTANTIALLY UNINFLUENCED BY EXTERNAL VARIABLES
Kimisuke Shirae, 15 Rokkakubashi-cho, Kanagawa-ku, Yokohama, Japan; Tamotsu Kobayashi, Myojindai, Hodogaya-ku, Yokohama, Japan; and Isao Abe, 449 Shimomaruko-cho, Ota-ku, Tokyo, Japan
Filed Sept. 6, 1961, Ser. No. 136,252
Claims priority, application Japan, Nov. 11, 1960, 35/45,307
3 Claims. (Cl. 330—6)

It is well known that, when any quantity such as temperature or rate of flow, to be measured is transformed into a corresponding electric quantity convenient for measurement thereof, by suitable means, such as a transducer, and output value will be obtained from the transducer which has a magnitude which is not only a certain function of the variable to be measured but also is a function of variables influenced by external conditions, such as the voltage of a power source and the ambient temperature.

Methods, using transducers, for obtaining an output which is simply a function of a variable to be measured, with substantially no influence from external conditions, are known. A known arrangement employs a converter element capable of converting two input currents into an output voltage proportional to the product of the two currents. For example, in a multipler utilizing the Hall effect, the variable to be measured is translated by means of a transducer into an electrical signal which is applied to the input circuit of an amplifier. The output current of the amplifier is introduced into one input circuit of the converter element, and a variable current, influenced by external conditions, is introduced into the other input circuit of the converter element. The output of the converter element is applied, as a negative feedback signal, to the input circuit of the amplifier. Thereby, the desired output value appears at the output of the amplifier.

While such an arrangement eliminates the effects due to variables influenced by external conditions, it cannot compensate for variations due to the multiplication characteristic of the converter element, even when negative feedback is used. Thus, to obtain a measurement of much higher accuracy, the converter element should have a particularly accurate multiplication characteristic and, as a rule, this is very difficult to be realized in practice. Considering, for example, the fact that the non-linearity of field exciting current versus Hall E.M.F. of a commercially available Hall-effect multiplier, in which, generally, indium-arsenide (In-As) is considered the best active material, is about 1 percent, that the hysteresis effect due to the material forming the magnetic field is also about 1 percent, and that the temperature coefficient of the Hall constant is $-0.07\%/^\circ$ C., great difficulty is encountered in attaining a measuring accuracy higher than one percent in any known method, unless a very complicated compensation procedure is followed.

The present invention relates to an electric transducer arrangement in which, taking advantage of the fact that the transfer impedance for the input current versus Hall E.M.F. generated in the Hall element of the above mentioned Hall-effect multiplier manifests a desirable linearity with respect to the input amplitude and the frequency under a constant magnetic field, the difficulties of prior methods can be overcome by utilizing an auxiliary current of a frequency differing from that of the current influenced by variables effected by external conditions. Thereby the influence of variables due to external conditions is completely eliminated, and the desired conditions for the converter elements are realized.

In accordance with the invention, the circuit arrangement includes a transducer, to convert the variable to be measured into an electric signal, an amplifier to amplify the electric signal, a converter element, an auxiliary current source, and a filter. The converter element is designed to provide an output voltage which is proportional to a continuous function of a first current, multiplied by a second current, with the converter element having a characteristic such that the coefficient of proportion between the input and the output current is not influenced by the frequency of the second current. The auxiliary power source may have any suitable frequency.

The first current, which corresponds to the output of the amplifier, is introduced into the converter element and the second current, which is the sum of the auxiliary current and a current corresponding to the variables influenced by external conditions, is also introduced into the converter element. The current influenced by external variables has a frequency different from that of the auxiliary current. Thereby the converter output voltage includes first and second frequency voltage components, with the first frequency voltage component corresponding to the amplifier output and the variables influenced by external conditions, and the second frequency voltage component corresponding to the combination of the amplifier output current and the auxiliary current. The filter separates the output voltage into the two frequency components, the first frequency component being fed back to the input side of the amplifier, and the second frequency component being taken out as the desired output.

In the accompanying drawings are shown some embodiments of this invention of which:
FIG. 1 is a block diagram of an arrangement according to this invention,
FIG. 2 and FIG. 3 are diagrammatic illustrations of converter elements, and
FIG. 4 is a circuit diagram, in which the invention is applied to measuring equipment for low temperature.

Referring to the drawings, and particularly to FIG. 1, a converter element is indicated at 3. When element 3 is provided with first and second currents at its input, it will provide, at its output, a voltage proportional to the product of the second current and a continuous function of the first current, and the output of the converter is independent of the frequency of the second current. A transducer 1 translates a variable $x$ to be measured into an electric signal. This conversion is effected under the influence of external conditions. Stated another way, the conversion is governed as a function of a variable $y$. For example, the transducer may be a flow meter translating a flow rate $x$ of a fluid into an electric voltage or potential.

An amplifier 2 amplifies the electric signal to provide an output current $I_1$ which is supplied to converter element 3 as the first input current of the latter. A suitable current source delivers a current $I_2$ at 3, and may be a type of transducers whose output is adapted to be similarly influenced by the same external conditions influencing the output of transducer 1, or whose output may be governed by a function of the variable $y$. An auxiliary current source is indicated at 4, and may be a source of either direct current or alternating current of a suitable frequency other than that of the auxiliary source, or that of the current $I_1$ or $I_2$. Auxiliary source 4 delivers an auxiliary current $I_3$ which is the other component of the second current supplied to the input of converter element 3. A filter 5 separates the output of converter element 3 into two components $e_2$ and $e_3$ by frequency separation. The first component $e_2$ is fed back to the input side of amplifier 2, and the second component $e_3$ is the "read-out" value of transducer 1 or a reliable reading of a flow meter, for example.

The operating manner of the above stated arrangement will now be analytically explained as follows:

The output voltage $e_1$ of the transducer 1 is not only a function of the variable $x$ to be measured but also a function of the variable $y$ influenced by external conditions, so that it may be expressed, $$e_1 = f(x) \cdot g(y) \quad (1)$$

If the difference of $e_1$ and fed back voltage $e_2$ is applied to the amplifier 2, the output of the amplifier will be $$I_1 = K_1(e_1 - e_2) \quad (2)$$

where, $K_1$ is an amplification constant.

The current $I_1$ is introduced into converter element 3 as the "first" current. Current $I_2$, which is governed by the variable $y$, together with the current $I_3$, or the sum of the currents $I_2$ and $I_3$, is introduced into converter element 3 as the "second" current. Thereby, the output voltage of the converter element consists of the first frequency voltage components $e_2$, related to the currents $I_1$ and $I_2$, and the second frequency component $e_3$, related to the currents $I_1$ and $I_3$. The above output voltage will be frequency separated by means of the filter 5 into the first and second frequency components, $e_2$ and $e_3$. Namely, $$e_2 = K_2 I_2 h(I_1) \quad (3)$$

and $$e_3 = K_2 I_3 h(I_1) \quad (4)$$

where, $K_2$ is a constant, and $h(I_1)$ is a continuous function of $I_1$.

If $I_2$ is suitable selected such that an equation $$I_2 = K_3 \cdot g(y) \quad (5)$$

may be established, we have, from the Equations 1, 2, 3, 4 and 5, an equation $$e_3 = \frac{f(x) \cdot g(y) - I_1/K_1}{K_3 \cdot g(y)} \cdot I_3 \quad (6)$$

If the amplification constant $K_1$ is selected to be large enough to consider $$f(x) \cdot g(y) \gg I_1/K_1$$

we shall have $$e_3 = \frac{f(x)}{K_3} \cdot I_3 \quad (7)$$

from which it is shown that the second frequency component, $e_3$, is not influenced by any of $g(y)$, $K_1$, $K_2$ and $h(I_1)$, so that it is exactly proportional to $f(x)$, the function of the variable to be measured, if $K_3$ and $I_3$ are constant.

In the hitherto known method, the output current $I_1$ of the amplifier is a result, which can be expressed by employing the Equations 1, 2, 3 and 5, such as $$I_1 = \frac{K_1 \cdot f(x) \cdot g(y)}{1 + K_1 K_2 K_3 \cdot g(y) [h(I_1)/I_1]} \quad (8)$$

By taking the amplifying constant $K_1$ large enough, we shall have $$I_1 = \frac{f(x)}{K_2 K_3 [h(I_1)/I_1]} \quad (9)$$

which shows that $I_1$ is not proportional to $f(x)$, unless $K_2$ and $[h(I_1)/I_1]$ are exactly constant.

It may be seen that such a defect in the prior method is eliminated by the present invention.

In the above illustration the input and output of the converter element were current and voltage, respectively, but both the input and output may be voltage or both may be current.

FIG. 2 illustrates the case where a Hall-effect multiplier is utilized as the converter element 3. In FIG. 2, 6 is a cuboidal plate of Hall-effect material, 7 the field coil, 9 and 9', the input terminals for the plates 6, 8 and 8' the terminals for Hall voltage, and 10 the core for the magnetic circuit. If a D.C. current $I_1$ is introduced into the magnetic winding 7 to establish a field $H(I_1)$ which is a function of $I_1$( a current $I_2$ which is related to the variable $y$ is introduced into the input terminals 9 and 9', and the plate 6 is disposed with respect to the core 10 such that the directions H, 8–8' and 9–9' are normal to each other, a voltage $e_2$, whose frequency is the same as that of current $I_2$, will be generated between the terminals 8–8' for Hall voltage. Thus $$e_2 = \left( \frac{R(I_1) \cdot H(I_1)}{t} + r \right) I_2 \quad (10)$$

where $R(I_1)$ is the coefficient of Hall-effect, which is a function of intensity of magnetic field H, namely, of the current $I_1$, $t$ is the thickness of the plate 6, and $r$ is the so-called residual resistance resulting from the fact that the directions 9–9' and 8–8' would not exactly be normal to each other.

It should be noted that, in FIG. 2, current $I_2$ corresponds to current $I_2$ of the case of FIG. 1. However, if a combined current, comprising the currents $I_2$ and $I_3$, be made to flow through the terminals 8 and 8', there will again be produced the voltage $$e_3 = \left( \frac{R(I_1) \cdot H(I_1)}{t} + r \right) I_3$$

as a matter of course.

Comparing the Equation 10 with the Equation 3, we have, $$h(I_1) = \frac{R(I_1) \cdot H(I_1)}{t} + r$$

and $$K_2 = 1$$

of which depends on the current $I_2$, so that this Hall-effect device may be used as the converter element of the invention. In the above, it is not a necessary condition that there is an exact linear relation between the magnetic field current and the Hall E.M.F., but it is satisfactory if they are related by a continuous function.

FIG. 3 illustrates the case where an indirectly heated thermistor is employed as the converter element. In the drawing, 11 is the heater, 12 the thermistor, 13 and 13' heater leads, 14 and 14' thermistor leads, and 15 the envelope. If the current $I_2 + I_3$ is connected to the leads 14, 14' to flow through the thermistor 12, the voltage drop $e_2 + e_3$ across the leads 14, 14' is proportional to the current $I_2 + I_3$ as long as the latter is low in value. However, as the value of the current $I_2 + I_3$ increases, the rate of change of the voltage drop $e_2 + e_3$ decreases, thus corresponding to a negative resistance characteristic. The current may be either D.C. or A.C. The resulting characteristic curve may be shifted by passing a heating current $I_1$ through the terminals 13, 13' and thus through the heating coil 11. This, in effect, amounts to multiplication of the current $I_1$ and the current $I_2 + I_3$.

In addition, to the use of a Hall effect multiplier and a thermistor as the converter element 3, there may also be used a device of the type exhibiting a magneto-resistance effect. In this case, the output voltage is a function of a current $I_2$ flowing through the material having the magneto-resistance effect and which material is disposed in a magnetic field excited by the current $I_1$.

FIG. 4 is a circuit diagram of an arrangement in which the device according to this invention is incorporated in a resistance thermometer, in which $R_1$, $R_2$ and $R_3$ are fixed resistances, $R_t$ a temperature measuring resistance bulb, such as a termistor, E the A.C. source, 16 and 16' output terminals of the bridge, 17 and 17' input terminals of amplifier 18, 19 a rectifier circuit, 20 and 20' input terminals of magnetic exciting coil 21 for the Hall-effect multiplier, 22 the Hall element, 23 and 23' input current terminals therefor, 24 and 24' terminals for the Hall E.M.F., 25 D.C. voltage stabilizing equipment, 26 and 26' output terminals thereof, 27 and 28 choke coils, and 29 and 30 condensers. The above mentioned members in FIG. 4 correspond to those in FIG. 1, respectively, in such a manner that the bridge, consisting of $R_1$, $R_2$, $R_3$ and $R_t$ and including the power source E, corresponds to the transducer 1 of FIG. 1, the amplifier 18 and the rectifier circuit 19 to the amplifier 2 whose output is current I, the exciting coil 21 and the Hall-effect material 22 to the converter element 3, the D.C. voltage stabilizer 25 to the auxiliary source 4 producing current $I_3$, choke 27 and condenser 29 to the filter 5, the voltage between output terminals 16 and 16' of the bridge to the output voltage $e_2$, the D.C. current flowing between the terminals 20 and 20' to the current $I_1$, the A.C. and D.C. current flowing between the terminals 23 and 23' to the current $I_2$ and $I_3$, respectively, the voltage between the terminals 16' and 17' to $e_2$, and the voltage between terminals 26 and 26' to the voltage $e_3$. In the above arrangement, it should be understood that the inductances of the chokes 27 and 28 and the capacitances of the condensers 29 and 30 have values selected to meet the purpose.

The output voltage $e_1$ of the bridge is a function of the variable $x$ to be measured, and is proportional to the source voltage E. The source voltage E varies as a function of the variable $y$ due to external conditions, or E equals $g(y)$. The variable $x$ to be measured is also a function of the resistance of the bulb $R_t$.

As evident from the previous illustrations, in this case also there is established the Equation 7, namely, $$e_3 = \frac{f(x)}{K_3} I_3 \qquad (7)$$

If the output resistances, to which the currents $I_2$ and $I_3$ are related, are $r_1$ and $R_2$, respectively, the resistance existing between the input current terminals 23 and 23' of the Hall element 22 is $r_3$, and the voltage of the D.C. voltage stabilizing device 25 is $E_0$, then we shall have $$I_2 = \frac{E}{r_1 + r_3} \qquad (11)$$

$$I_3 = \frac{E_0}{r_2 + r_3} \qquad (12)$$

Comparing the Equation 11 with the Equation 5, $$K_3 = \frac{1}{r_1 + r_3} \text{ (because } g(y) = E\text{)}$$

and, inserting the above value $K_3$, and the Equation 12, into the Equation 7, we have $$e_3 = f(x) \cdot E_0 \frac{r_1 + r_3}{r_2 + r_3}$$

If we make, $r_1 = r_2$ or $r_1 \ll r_3$, and $r_2 \ll r_3$, then we have $$e_3 = f(x) \cdot E_0$$

That is to say, the voltage $e_3$ is exactly proportioned to $f(x)$, if the voltage $E_0$ be constant.

It is obvious that the method according to this invention enables completely to eliminate the influence of the variable effected by external conditions even with a converter element which does not have a constant multiplication characteristic.

A practical measurement of the relation between the voltage $e_3$ and the Equation 1, $e_1 = f(x) \cdot g(y)$ or $$e_1/E = f(x)$$

for the circuit arrangement of FIG. 4, was performed by applicants, using the Hall-effect multiplicator in which indium arsenide, In-As, is utilized, and the following resulted:

The nonlinearity was less than 0.1%, and the variation of the output with a variation of ±10% of E was less than ±0.1%, no hysteresis effect being observed.

Further, any quantity to be measured may be converted into an electric signal with much higher accuracy as compared to the prior art, by adding an auxiliary current source and a filter. Thus, this invention has a very great commercial advantage in a transducer which is easily embodied and highly advantageous as stated above.

A similar favorable result may be attained when this invention is applied to those instruments other than the above resistance thermometer, for example, to an electromagnetic flowmeter, displacement-electric current transducer utilizing differential transformer, etc.

We claim:
1. Electrical measuring apparatus, for providing an electrical output signal substantially directly proportional to a quantity to be measured, said apparatus comprising, in combination, a transducer operable to convert variations in a quantity to be measured into variations in a transducer output voltage; a first source of A.C. potential connected to said transducer; the transducer output voltage being proportional to said potential and to the quantity to be measured, and being influenced by external variables such as potential vairations of said first source and variations in ambient temperature; an amplifier; means applying the transducer output voltage to the input of said amplifier, said amplifier converting its input voltage into a first current at the amplifier output; a converter having a pair of inputs and an output, said converter, when supplied with currents at its respective inputs, delivering an output voltage proportional to the product of one current and a continuous function of the other current, and independent of the frequency of said one current; an auxiliary current source providing an axially current, and differing in frequency from said first source; circuit means connecting said amplifier output to one converter input to feed said first current to said converter as said other input current of the latter; circuit means, including said auxiliary current source, connected to the other converter input to feed a second current to said converter as said one input current of the latter; said second current including, as one component, the current from said auxiliary source and, as the other component, a current from a source differing in frequency from said auxiliary current source and influenced by said external variables; a filter connected to the output of said converter and frequency dividing the converter output voltage into a first frequency voltage component corresponding to the said first current, influenced by external variables, and a second frequency voltage component corresponding to said first current combined with said auxiliary current; and circuit means applying said first frequency voltage component to the amplifier input in opposition to the transducer output voltage applied thereto; said second frequency voltage component providing an output signal substantially directly proportional to the quantity to be measured and substantially uninfluenced by said external variables.

2. Electrical measuring apparatus, as claimed in claim 1, in which said converter is a Hall converter including a body of Hall-effect material having input terminals, a magnetic core operatively associated with said body and an exciting winding on said core and having input terminals; said first current being applied to said exciting coil and said second current being applied to the input of said body of Hall-effect material.

3. Electrical measuring apparatus, as claimed in claim 1, in which said converter comprises a thermistor, having a first pair of input terminals, and a heating resistance operatively associated with said thermistor and having a second pair of input terminals and said second current being applied to said first pair of input terminals.

References Cited by the Examiner
UNITED STATES PATENTS
2,622,150   12/1952   Coulter et al. _____ 330—151 XR ROY LAKE, *Primary Examiner.*

RON P. KANANEN, ARTHUR GAUSS, *Examiners.*